United States Patent [19]

O'Neill

[11] Patent Number: 4,640,039
[45] Date of Patent: Feb. 3, 1987

[54] APPARATUS FOR RETAINING FISHING RODS IN A BOAT

[76] Inventor: John C. O'Neill, P.O. Box 4095, Overland Park, Kans. 66204

[21] Appl. No.: 752,632

[22] Filed: Jul. 8, 1985

[51] Int. Cl.$^4$ .............................................. A01K 97/08
[52] U.S. Cl. ....................................... 43/21.2; 43/54.1
[58] Field of Search ...................... 43/21.2, 57.1, 54.1; 248/205.2; 24/306, 442; 114/343, 364

[56] References Cited

U.S. PATENT DOCUMENTS

| | | | |
|---|---|---|---|
| 3,279,008 | 10/1966 | Wallach | 24/306 |
| 3,640,273 | 2/1972 | Ray | 24/306 |
| 3,841,648 | 10/1974 | Meyer | 24/306 |
| 3,881,442 | 5/1975 | Seiple | 114/364 |
| 3,925,836 | 12/1975 | Simmonds | 114/364 |
| 3,947,927 | 4/1976 | Rosenthal | 24/306 |
| 3,994,048 | 11/1976 | Rosenthal | 24/306 |
| 4,170,801 | 10/1979 | Ward | 114/343 |
| 4,273,130 | 6/1981 | Simpson | 24/306 |
| 4,386,723 | 6/1983 | Mule | 24/306 |
| 4,528,700 | 7/1985 | Johnston | 24/306 |
| 4,593,642 | 6/1986 | Shay | 114/364 |

Primary Examiner—M. Jordan
Attorney, Agent, or Firm—Schmidt, Johnson, Hovey & Williams

[57] ABSTRACT

Apparatus for retaining fishing rods in a boat includes an elongated, flexible belt to which is stitched a pair of opposed, spaced, flexible tapes of the type which includes hook and loop fasteners that matingly interlock when face-to-face. The holder is wrapped around the article in a snug fit relationship and is provided with connectors for mounting on the boat or other support.

1 Claim, 5 Drawing Figures

APPARATUS FOR RETAINING FISHING RODS IN A BOAT

BACKGROUND OF THE INVENTION

1. Field of the Invention

The present invention relates to a holder for one or more articles, such as fishing rods, in the nature of a flexible wrap-around retainer adapted for use in connection with boats.

Boaters, while fishing or cruising for pleasure usually carry a variety of paraphernalia, personal belongings and the like in their boats, subject to damage or loss overboard. The hazards are especially prevalent with respect to rods and reels, including the rod tips which, seemingly, are always under foot.

2. Summary of the Invention

Accordingly, the instant invention provides a flexible belt which may be easily and quickly strapped around the article or articles to be retained and then releasably locked in place with such snugness as may be needed or desired.

A pair of elongated, flexible fasteners are secured to the belt adjacent its ends on opposite faces of the belt. Each fastener is provided with upstanding, mating hooking elements of the hook and loop types. When placed in face-to-face relation, a number of releasable locks are presented which resist separation. Hence, when the holder encircles the article, the overlapped tapes matingly interact.

DESCRIPTION OF THE PREFERRED EMBODIMENT

Figure 2:
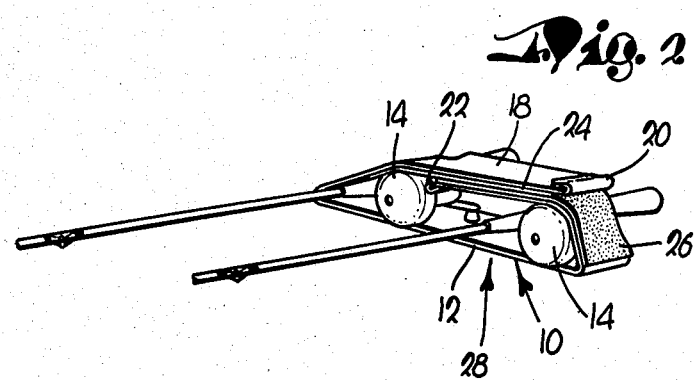
FIG. 2 is a perspective view showing the articles retained by the holder.
Figure 3:
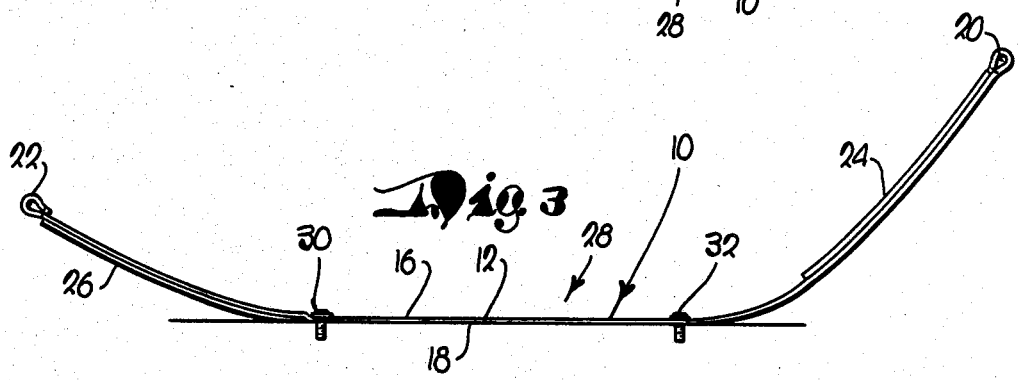
FIG. 3 is an elevational view of the holder showing the opposite, longitudinal edge thereof.
Figure 4:
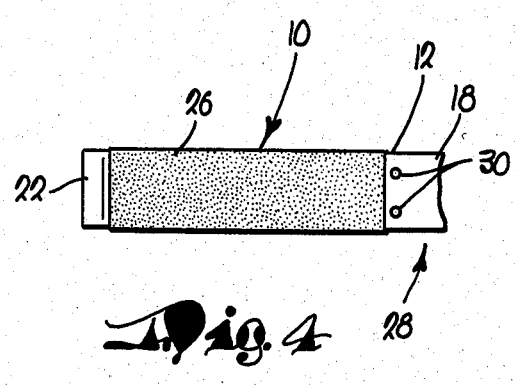
FIG. 4 is a fragmentary plan view of the holder showing one of the fastening tapes on one face of the belt adjacent one end of the latter.
Figure 5:
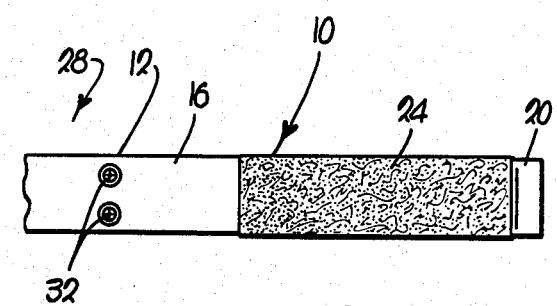
FIG. 5 is a fragmentary plan view of the holder showing the other fastening tape on the opposite face of the belt adjacent the other end of the latter.

Apparatus 10 in the nature of a holder, shown in the drawings includes an elongated, flexible belt 12 adapted, as seen in FIG. 2, to encircle and, therefore retain, for example, a pair of fishing line reels 14. The belt 12 has a pair of opposed faces 16 and 18 and a pair of terminal ends defined by finger tabs 20 and 22.

The belt 12 has a pair of elongated, flexible fastening tapes 24 and 26 stiched thereto. The tape 24 directly engages the face 16 adjacent the tab 20 whereas the tape 26 directly engages the face 18 adjacent the tab 22. The tapes 24 and 26 are of the width as the belt 12 but shorter than the latter, leaving an intermediate belt zone 28 devoid of any such tape 24 or 26. Therefore, the tape 24 overlaps the tape 26 in face-to-face relationship thereto when the belt 12 is looped around the reels 14 as shown in FIG. 2.

The holder 10 may be attached to a boat or other support by a pair of screws 30 or the like passing through the belt zone 28 adjacent the tape 26 and a second pair of screws 32 through the zone 28, spaced from the tape 24. The tabs 20 and 22 comprise end borders for the belt 12 by doubling the latter back and stitching the tabs 20 and 22 down to present end hems.

The identical tapes 24 and 26 of equal lengths are marketed under the trademark "OUI-LOK" by OUI-LOK Corporation, 230 Elliot, Brockton, Mass. They are characterized by the provision of a multitude of fasteners which permit preselection of the snugness of the fit of the belt 12 around the reels 14.

Each of the fasteners is made up of a number of hooks and a number of loops. The hooks and loops present a plurality of separable connectors which matingly interlock when the tapes 18 and 20 are in the face-to-face relationship shown in FIG. 2.

OPERATION

Figure 1:
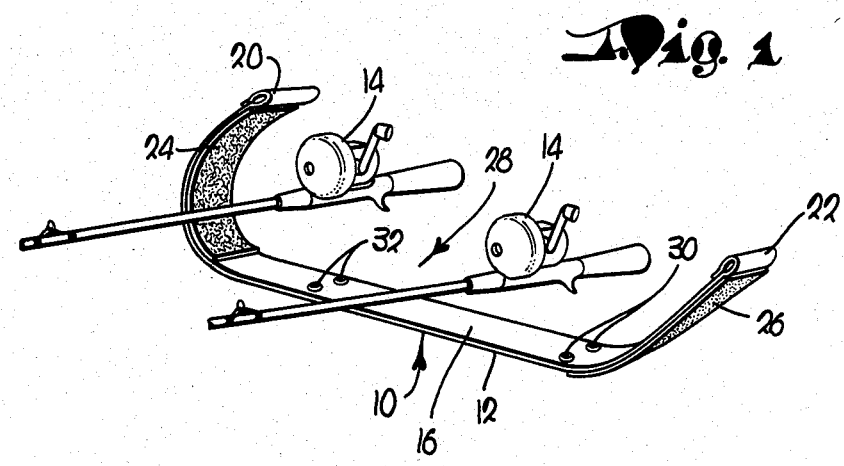
FIG. 1 is a perspective view of a holder made in accordance to my present invention illustrating one longitudinal edge thereof and showing the same in relationship to a pair of articles preparatory to wrapping the holder around the articles.

When one or more articles, such as reels 14, fishing rods and poles, water skiis, beach towels or other items are to be retained by the holder 10, they may be simply laid in place on the stretch of the belt 12 defined by the zone 28 as demonstrated by FIG. 1. Thereupon, the belt 12 is folded over with the tape 26 facing upwardly, followed by folding of the belt 12 such as to place the tape 24 into superimposed relationship to the tape 26. By use of the tab 20, the holder may now be pulled snugly around the items 14 and the tape 24 pressed against the tape 26 to effect the interconnection therebetween. Such operation may be carried out even when the holder is first attached to the side of a boat by use of the screws 30 and 32. Noteworthy is the fact that the overall size of the inner loop of the holder 10 is adjustable by virtue of the use of tapes 24 and 26 of the hook and loop type above described.

While fishing, the holder 10 retains the article or articles under the roughest of water conditions and highest of boat speeds. The holder 10 keeps the rods at the fingertips of the fisherman and maintains the rod tips securely out from under foot, even for campers while not fishing or boating. The tabs 20 and 22 permit easy release of the holder when desired.

I claim:

1. In combination with a boat having a generally rigid supporting surface, apparatus for holding an article with respect to said surface comprising:
    an elongated, flexible belt adapted to encircle the article to be held, said belt having a pair of opposed faces and a pair of terminal ends, one of said faces having a stretch thereof in overlying engagement with the supporting surface of the boat, said stretch being essentially parallel to said surface;
    means for attaching the belt to said supporting surface, said means being located adjacent each end of said stretch whereby to retain the stretch in said overlying, parallel relationship to said supporting surface;
    a first fastening tape secured to said one face of the belt between one terminal end of the belt and the proximal means for attaching the belt to the surface; and
    a second fastening tape secured to the other face of the belt between the other terminal end of the belt and the proximal means for attaching the belt to the surface, said tapes being matingly engageable;
    said belt being swingable about said spaced-apart attaching means whereby articles to be held with respect to said supporting surface may be placed at said stretch of the belt and the first tape placed over the articles to be held and said second tape brought into overlying engagement with the first tape to matingly engage the tapes over said stretch and said articles to thereby firmly hold said articles in place with respect to the supporting surface of the boat.

* * * * *